Nov. 21, 1967  F. L. HILL ET AL  3,353,342
HARVESTER PICKUP
Filed July 20, 1966  4 Sheets-Sheet 1
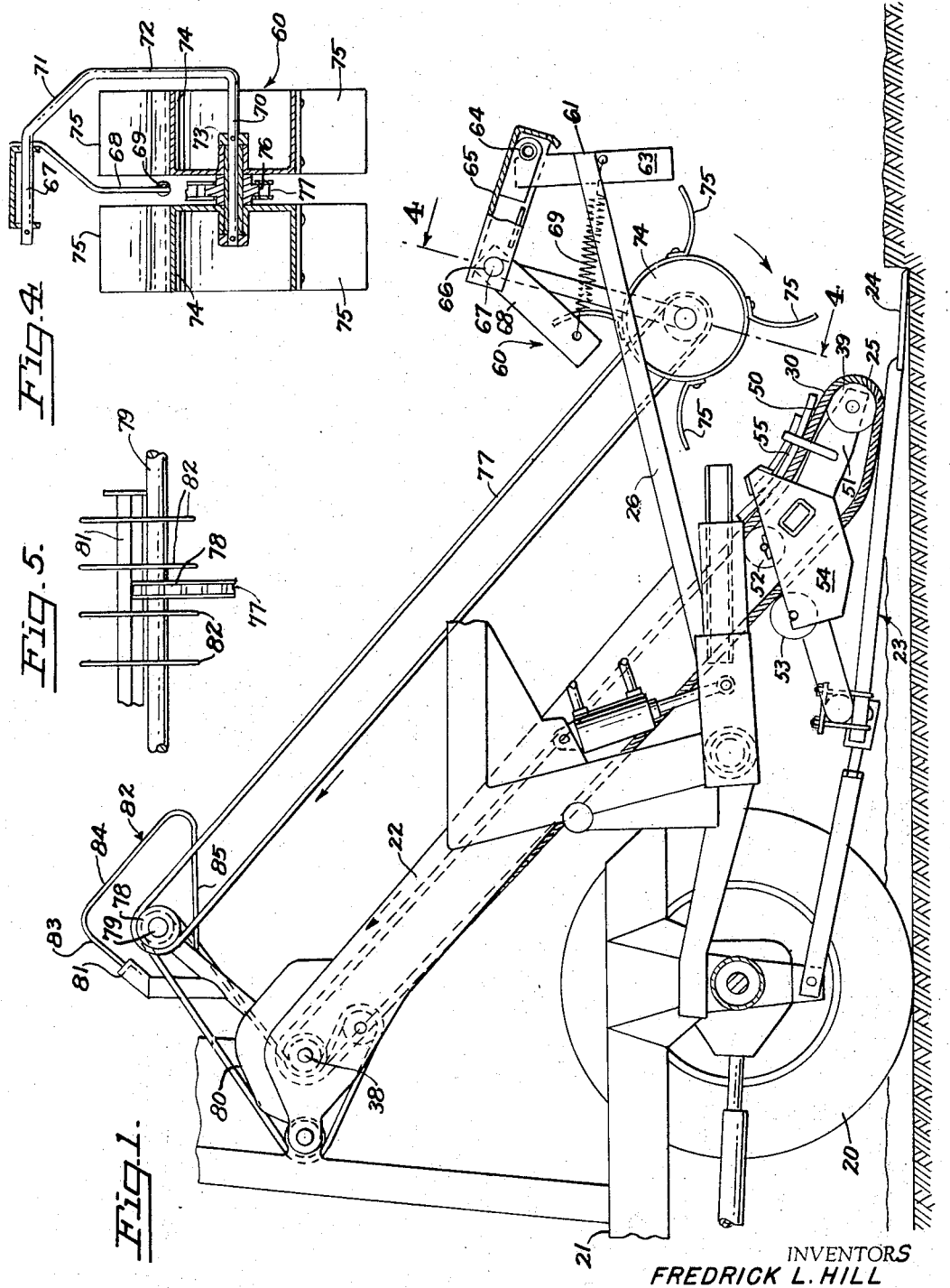
INVENTORS
FREDRICK L. HILL
LAUREN W. GATES
BY
Owen, Wickersham & Erickson
ATTORNEYS

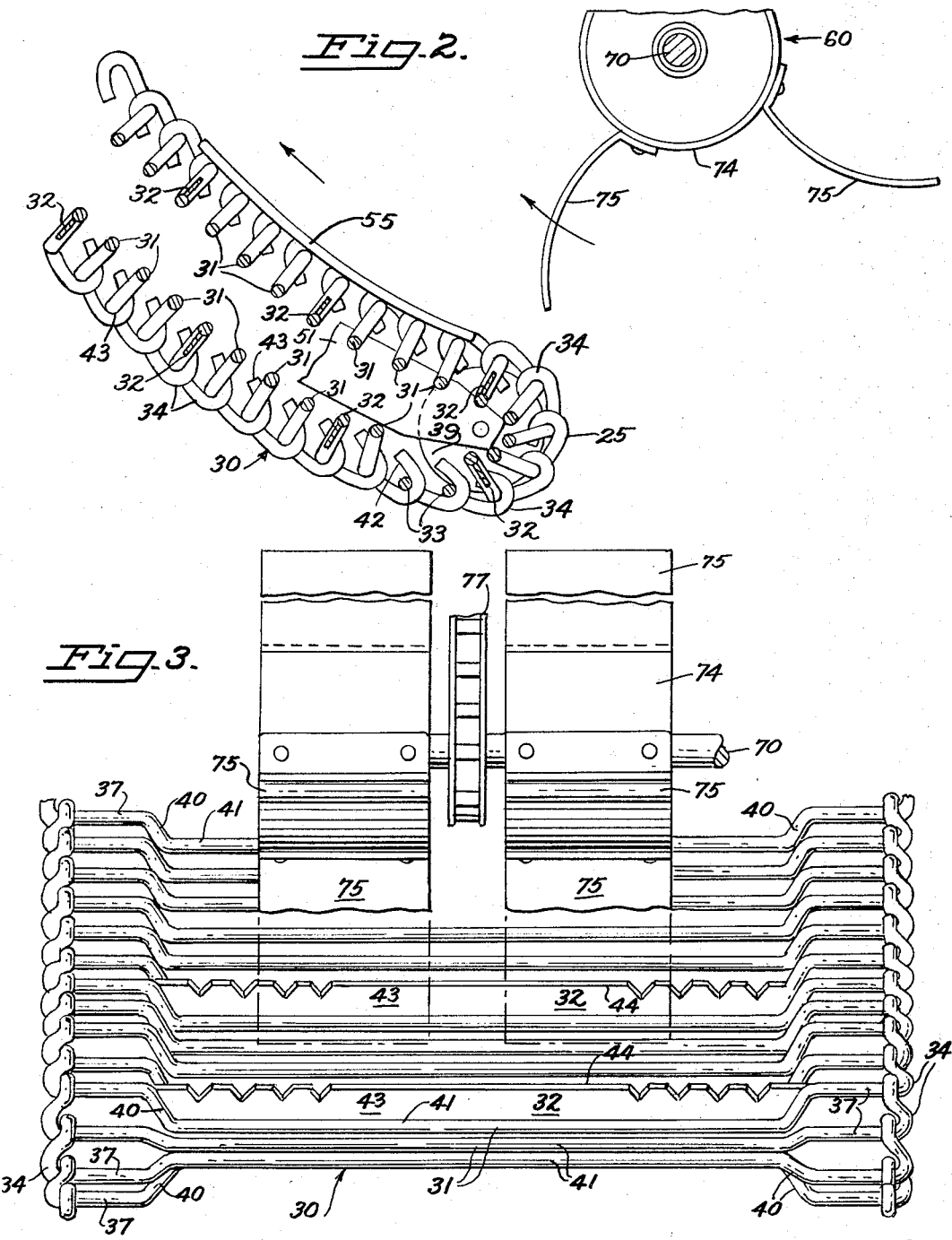

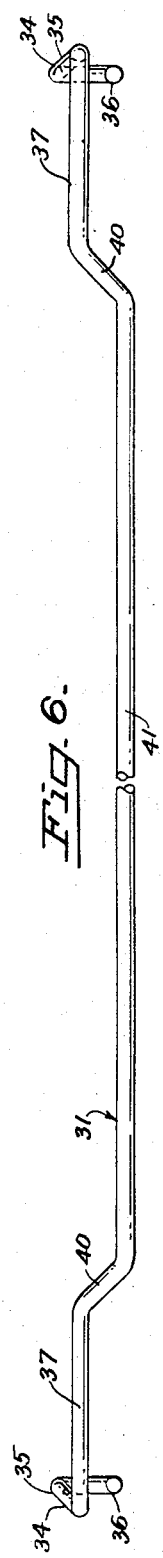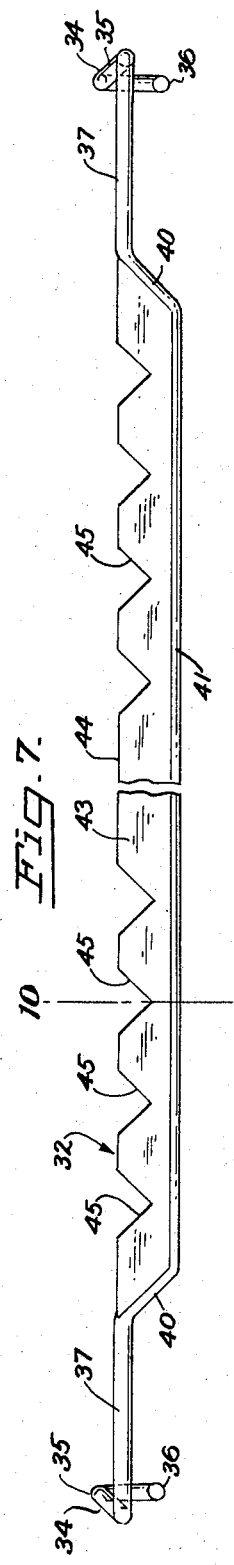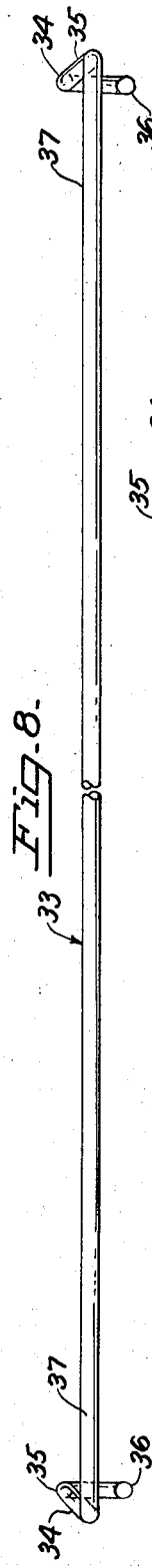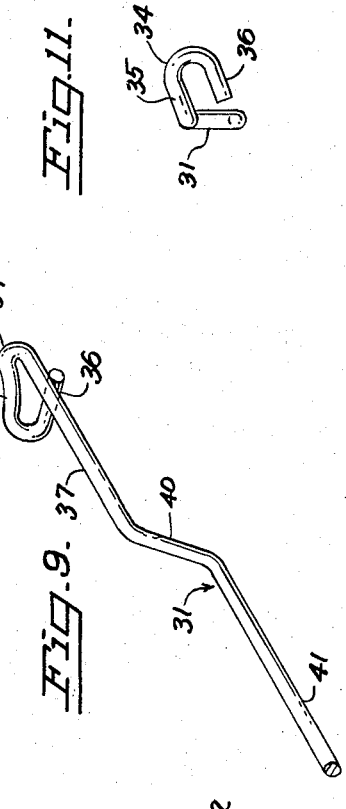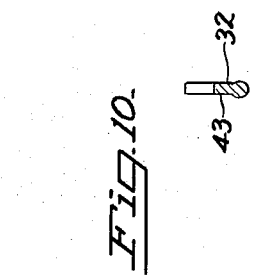

Nov. 21, 1967  F. L. HILL ET AL  3,353,342
HARVESTER PICKUP
Filed July 20, 1966  4 Sheets-Sheet 4
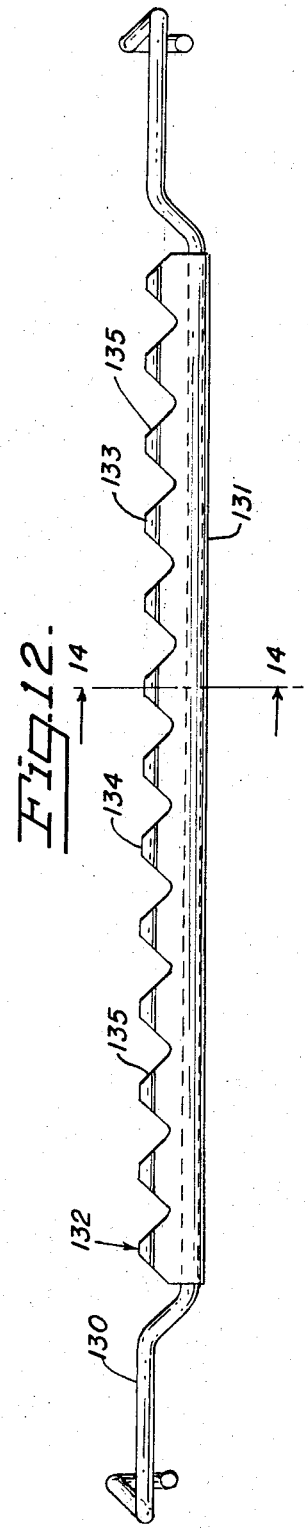
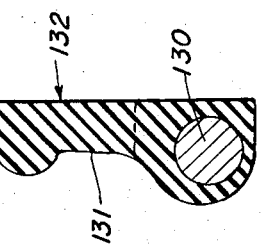
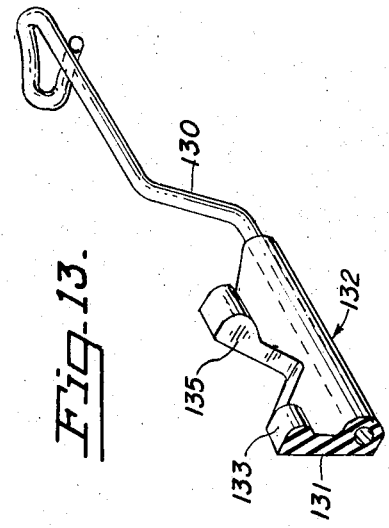
INVENTORS
FREDRICK L. HILL
LAUREN W. GATES
BY
Owen, Wickersham & Erickson
ATTORNEYS

United States Patent Office 3,353,342
Patented Nov. 21, 1967

3,353,342
HARVESTER PICKUP
Frederick L. Hill, Rio Vista, and Lauren W. Gates, Stockton, Calif., assignors to The Regents of the University of California, Berkeley, Calif.
Filed July 20, 1966, Ser. No. 566,686
23 Claims. (Cl. 56—327)

ABSTRACT OF THE DISCLOSURE

A crop pickup device for a harvesting machine has a pickup frame extending rearwardly and upwardly from a front end adjacent and above ground level supporting an endless conveyor made of a series of interlocked transverse bars to provide an upwardly and rearwardly moving upper reach. The bars are inset for their full length except for short end portions adjacent their ends to provide a trough-like central portion that extends down on the upper reach and up on the lower reach, so that the upper and lower reaches of these central portions lie very close to each other and provide a short radius of turn at the lower end. The forward end of the conveyor has an initial nearly horizontal portion. Flat rubber flight bars with notched upper edges, secured to some of the inset bars at regular intervals along said conveyor, provide flights. A yieldably mounted assist drum is held above the lower end of the conveyor, and a drive chain frictionally engages the drum for rotating it and extending centrally above the conveyor for substantially its full length to help it carry up the crop. At the upper end, above the conveyor are generally downwardly extending tines.

---

This application is a continuation-in-part of application Ser. No. 345,738, filed Feb. 18, 1964, now abandoned.

This invention relates to improvements in harvesters and particularly to improvements of the pickup and elevating mechanism for tomato harvesters, though it can also be used to harvest other crops.

One of the difficulties encountered in tomato harvesting is how to pick up the tomato plants so gently and efficiently that substantially all the tomatoes are brought up to a recovery station. Tomatoes tend to be rather easily shaken off the vines, particularly when they are the desirable ripe tomatoes. Any undue disturbance of the vines before they reach the recovery station is liable to result in the loss of a good many tomatoes that are not recoverable. We have hitherto pointed out the desirability of having the forward ground speed of the harvester be nearly identical to the rearward speed of the pickup conveyor, especially at the pickup point, so that the lifting of the vines is substantially vertical. However, it has been found that the movement around an arc at the pickup point of tines and other devices used to pick up plants tends to upset this equilibrium, since the tip velocity of the tines increases as they move around this arc and their motion is faster than the conveyor and therefore imparts a type of shaking action that tends to shake off some of the tomatoes at this point and prevent their recovery by the machine.

Moreover, it is inevitable, in view of the roughness of farm ground, that there will be some shaking action during the upward movement of the vines along the elevating conveyor; heretofore this has resulted in many tomatoes rolling down the conveyor and on to the ground and being lost thereby.

Another disadvantage of some prior devices has been their tendency to pickup large quantities of soil, either as dirt or mud, depending upon the degree of wetness encountered. In either event, this soil must be gotten rid of or it tends to cause trouble; it certainly has to be eliminated before the tomatoes are themselves deposited in field containers.

Consequently, some of the objects of this invention are to obtain a careful and gentle pickup of harvested plants, including tomato plants carrying tomatoes, to prevent tomatoes and similar fruit that become agitated during their elevation from rolling down back onto the ground, and to eliminate picked-up dirt at the early stages of the pickup and elevation operation, so that there is much less dirt to be gotten rid of later on.

Specifically, one object of the invention is to provide a very low speed of the pickup mechanism at the actual forward pickup end of the conveyor, where the conveyor turns its loop and to reduce the amount of dirt picked up there, as well as to eliminate such dirt as is picked up.

Another object of the invention is to provide for a very low pickup device whose forward end lies above but quite close to the ground, so that the conveyor can get under the plant without having to get under the ground and therefore can be sure to pick up all the plant and to pick it up from beneath, while at the same time not picking up an excessive amount of dirt.

Another problem to which the invention relates is that of holding down the plants that are picked up to insure their movement on up the conveyor instead of their rolling down or being rolled along in front of the pickup conveyor and to keep maintaining them on the conveyor as they go up so that they do not tend to roll back. In addition it is important to see that at the very top of the conveyor where the plants pass to the next treatment zone of the harvester for further processing, the vines are kept down and do not bounce around and fall down the conveyor. Hence, the solution of these problems is also among the objects of this invention.

Other objects and advantages of the invention will appear from a detailed description of a preferred form thereof.

In the drawings:

FIG. 1 is a view in side elevation and partly in section of a harvester pickup device embodying the principles of the invention.

FIG. 2 is a fragmentary view in elevation and in section of the lower portion of the device showing the construction of the conveyor and its appearance at the lower end and showing how the loops are closed as they go around their short radius at the lower end and also showing the operation of the assist device above the chain and the dirt freeing operation at the bottom of the conveyor.

FIG. 3 is a fragmentary view in front elevation of the lower portion of the device.

FIG. 4 is a view in front elevation and in section of the assist device.

FIG. 5 is a fragmentary view in front elevation of the central portion of the upper end of the device.

FIG. 6 is a view in front elevation of one of the conveyor bars broken in the middle in order to conserve space.

FIG. 7 is a view similar to FIG. 6 of one of the flight bars, also broken in the middle to conserve space.

FIG. 8 is a similar view of one of the dirt-unloading bars, some of which are incorporated into the conveyor chain.

FIG. 9 is a fragmentary view in perspective of one end of the conveyor bar of FIG. 6.

FIG. 10 is a view in section taken along the line 10—10 in FIG. 7.

FIG. 11 is a view in end elevation of any one of the bars of FIGS. 6, 7, 9, and 10.

FIG. 12 is a view in front elevation of a modified form of flight bar.

FIG. 13 is a fragmentary view in perspective and partly in section taken along the line 13—13 in FIG. 12.

FIG. 14 is a view in section taken along the line 14—14 in FIG. 12.

A harvester of the invention is mounted on wheels 20 for movement through the fields. It is provided with a main frame 21 to which is pivoted an elevator frame 22 that supports the pickup and conveying unit of this invention. The support and mounting of the frame 22 are the same as those shown in our co-pending application Ser. No. 291,672. Also mounted in accordance with our earlier-filed application Ser. No. 291,672 is a cutter device 23 supporting a blade 24 just in front of the forward end 25 of the pickup unit.

The pickup unit of this invention includes an endless chain 30 made up of a series of bars 31, 32, and 33 like those shown in FIGS. 6, 7, and 8. The majority of bars are like the bar 31 shown in FIG. 6, with about every fourth or fifth bar being like the bar 32 shown in FIG. 7, and preferably there are some, e.g., three, pairs of bars 33 like those shown in FIG. 8 at spaced intervals.

The end portions 34 of all the bars 31, 32, and 33 are the same (having a bent-back-and-up portion 35 and lower forwardly extending locking hook 36) and these interlock, uniting the bars into the chain 30. An adjacent drive portion 37 engages with a sprocket wheel 38 at the top and an idler wheel 39 at the bottom of the device. The sprockets 38 are so driven that the conveyor 30 moves at substantially the ground speed of the vehicle, and, since it is moving rearwardly and upward so far as the tomato plant is concerned, the plant is subject to neither forward nor rearward movement but to a substantially vertical lifting movement.

The bars 31 and 32 are inset at a diagonal portion 40 at the inner ends of the drive portions, and almost the full extent of their length between their ends is an inset portion 41. As shown in FIGS. 2 and 3, the inset has the result that over the inset portions 41 the upper and lower reaches of the conveyor 30 lie closely adjacent each other rather than far apart, and for that reason also the inset portions 41 go around a very short arc at the lower end 25 and do so more slowly than the portions 37. Thus the conveyor movement is very slow at the turning point 39 where the most danger from shaking occurs. This insetting also tends to close the inset portions 41 of successive bars 31 and 32 together at the conveyor's lower end 25, as shown in FIG. 2, so that a minimum of dirt and trash and other material is picked up there. Then the bars open out as the space between them becomes greater on the upper reach so that dirt can fall out between them. In connection with this, it should be noted that at intervals straight bars 33 of FIG. 8 are grouped in pairs, and when such a pair of bars 33 approaches the lower end of the lower reach, they provide open spaces 42 through which the dirt that has fallen through the upper reach can more easily fall entirely out of the conveyor chain 30.

About every fourth or fifth bar, depending on the structure desired, of the conveyor 30 is a bar 32 like that of FIG. 7, which may be called a flight bar. This includes, in addition to a bar like the bar 30, a flat strip bar 43 welded across the indented portion 41 so that the upper edge 44 of the flat bar 43 lies at about the same height as the outer portions 37 of the bar 32. This is quite important for as a result, the velocity of the edge 44 does not increase as its bar 32 goes around the turning point 39, nor does the edge 44 project beyond the portions 37 into the dirt, thereby giving the gentle and careful pickup of harvested plants from the ground and giving the low speed of the pickup mechanism both referred to earlier in this specification. The edge 44 is notched by V-notches 45 at intervals so as to provide good catching edges and to prevent vines from slipping through. When made from metal, the central portion of the bar 43 is preferably not notched because of the strength requirement. A modified form of flight bar 132, shown in FIGS. 12-14 uses a bar 130 identical to the bar 30 and a molded rubber member 131 having a top edge 133 provided with notches 135. This gives more strength and enables the notches 135 to extend all the way across. By having the bars 32 spaced as every fourth or fifth bar, the other bars 31 act as a trough and the bars 32 act as a flight dividing point. When the bars 33 like those of FIG. 7 are used, a bar 32 precedes them to prevent them from scooping up large quantities of loose earth. Thus the tomato plants, instead of being picked up by tines, are picked up by flights, with the notches 45 serving to help to retain the plant, and the flights help to hold the tomatoes that do happen to fall off the vines, carrying them up and depositing them over the top of the conveyor into a tomato recovery portion of the harvester.

To further ease pickup of the plants, a forward portion 50 of the conveyor 30 is preferably pitched at a flatter angle than the main portion of the conveyor 30. This may be accomplished with the aid of a subframe 51 that is supported by the frame 20 and carries the idler wheel 39, by auxiliary idler wheels 52 and 53 carried by wing portions 54 of the subframe 51, and by a shoe 55 that overlies the critical turning portion of the upper reach of the chain ends 37, guiding the chains according to the desired pattern. This flat tilt of the portion 50 greatly eases the pickup, makes it more gentle, and helps greatly reduce losses heretofore due to plant disturbance at this point.

Thus, the chain 30 is so constructed that it provides a minimum relative velocity between the pickup and the product. The top of the conveyor 30 at the forward end 25 lies at a very short height above the ground; so the effective conveying portions of the conveyor are very low. At the forward end 25 a relatively closed nose is provided by the inset portions 41 for reducing the inclusion of foreign material, while the slotted construction otherwise maintained along the conveyor aids in separating out the fine material. There is a simple and effective discharging through the openings 42 of material which collects within the conveyor, and the whole is in fact of a simple, economical construction. The pitch-line portions 37 of the links and the edge 44 all run at constant velocity, but the conveying portions 41 run at reduced velocity while they are passing around the lower end 25.

A rotating-vane drum assist device 60 is preferably used to force the upper portions of the crop into and on the conveyor 30. For this purpose, a pair of side frame members 26 extend out forwardly from the elevator frame 22, and they are joined together at their forward end by a cross member 61. A vertical member 63 is secured to the cross member 61 and projects upwardly at the center thereof. It is provided with an ear 64 to which is pivoted a channel member 65 having a pivot journal 66 at its outboard, rearmost end. A rod 67 is pivoted in the journal 66 and has an outboard arm 68 welded to it and extending forwardly and down. A spring 69 yieldingly connects the arm 68 to the vertical member 63. The rod 67 is bent to provide an axle 70 joined to the portion 67 by portions 71 and 72. To this horizontal shaft 70, which lies above and just forward of the front end 25, are journaled for rotation a bearing member 73 supporting two short drums 74. Each drum 74 has a series of flaps 75, for example four, made up of flexible material such as belting material or elastomer. In between the drums 74 the bearing member 73 is provided with a smooth pulley portion 76 which is engaged by a central chain or V-belt 77 that extends down from a drive sprocket wheel 78 mounted on a drive shaft 79 on the upper end 80 of the conveyor 30 and driven by the conveyor driving means, so that the drums 74 and their flaps 75 are rotated by friction drive, with slip enabled as a safety measure to prevent machine damage. The chain 77 is spaced at an even distance above the centerline of the conveyor 30.

This drum assembly 60 serves to press the tomato plants lightly toward the conveyor 30 rather than permitting them to roll forward and to be pushed along in front of the forward end 25. The flaps 75 engage the plants, gently but firmly, and urge them upwardly beneath the drum 74 onto the conveyor 30, so that their forward and upper parts move along with the lower and rear portions on the conveyor 30, and the drums 74 and flaps 75 also prevent the plants from rolling back down. The drums 74 need only be at the center portion; there is no need to have such structure at the side portions, since the main body and bulk of the plants is located on center and since they are picked up in this manner. The positive driving assures that the upper part of the plant will not only be pressed toward the conveyor 30 but will move with it. At the same time the mounting spring 69 enables yielding if there is obstruction, the spring 69 yielding and permitting the space to open up and let the larger, more resistant plant get through.

Above the upper end 80 of the conveyor 30 is a stationary bar 81 and to that are secured a plurality of tines 82, preferably again at the center portion with about two on each side of the chain or V-belt 77. These tines 82 may have an initially forwardly and upwardly extending portion 83 followed by a downwardly and forwardly extending portion 84 which leads to a rearwardly and horizontally extending portion 85. This assures that as the plants get up near the top, they are carried over the top and will not roll back down. It also prevents the plants or portions thereof from being carried around the headshaft 79 by the chain 77.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a harvesting machine, a crop pickup device including in combination
   a pickup frame extending rearwardly and upwardly from a front end adjacent ground level,
   an endless conveyor supported on said frame and comprising a series of bars interlocked with each other at each end and extending transversely across said frame to provide an upwardly and rearwardly moving upper reach and a downwardly and forwardly moving lower reach,
   said bars being inset for their full length, except for short end portions adjacent their ends, to provide a trough-like central portion that extends down on the upper reach and up on the lower reach, so that the upper and lower reaches of said central portions lie very close to each other and provide a short radius of turn at the lower end,
   flat flight bars secured to some of said inset bars at regular intervals along said conveyor to provide flights, the upper edges of said bars being approximately even with the end portions of the bars,
   an assist drum assembly rotatably supported by said frame above the lower end of said conveyor and having yieldable means for engagement with the incoming crop, and
   drive means for moving said conveyor and for rotating said drum, said drive means comprising a continuous belt overlying and spaced above and generally parallel to said conveyor centrally for substantially its full length, for preventing roll-back of plants moving up said conveyor by cooperation therewith.

2. The device of claim 1 having a plurality of generally downwardly extending tines supported by said frame adjacent a central portion of the upper end of said conveyor.

3. The device of claim 1 wherein the forward end of said conveyor is shaped to provide an initial nearly horizontal portion.

4. The device of claim 1 wherein said flight bars have an upper edge recessed at intervals by V-shaped notches to provide catching edges helping to retain vines.

5. The device of claim 1 wherein said flight bars comprise a flat rubber member.

6. The device of claim 1 wherein said assist drum has a plurality of flexible free vanes extending out therefrom.

7. In a harvesting machine, a crop pickup device including in combination
   a pickup frame extending rearwardly and upwardly from a front end adjacent ground level,
   an endless conveyor supported on said frame and comprising a series of bars interlocked with each other at each end and extending transversely across said frame, and sprocket and idler wheels at the upper and lower extremities to provide an upwardly and rearwardly moving upper reach and a downwardly and forwardly moving lower reach,
   said bars being inset for their full length except short end portions adjacent their ends to provide a trough-like central portion that extends down on the upper reach and up on the lower reach, so that the upper and lower reaches of said central portions lie very close to each other and provide a short radius of turn at the lower end,
   said conveyor at its forward end being shaped to provide an initial nearly horizontal portion,
   said sprocket wheels having sprockets engaging said end portions to drive said conveyor,
   flat flight bars secured to some of said inset bars at regular intervals along said conveyor to provide flights, the upper ends of said bars being approximately even with the end portions of the bars,
   support means for an assist drum, above the lower end of said conveyor,
   an assist drum assembly rotatably mounted on said support means and having a plurality of yieldable crop engaging means,
   a drive chain frictionally engaging said drum assembly for rotating it and extending centrally above said conveyor for substantially its full length,
   a shaft extending transversely across said frame at the upper end thereof above said conveyor, and
   generally downwardly extending tines adjacent a central portion thereof.

8. The device of claim 7 having, between some pairs of adjacent flights, a pair of straight bars in place of two adjacent inset bars, to aid in ridding the interior of said conveyor from dirt as said pair of straight bars approaches the lower end of said conveyor, by means of the wide openings between the straight bars and the inset bars.

9. The device of claim 7 wherein said support means for said assist drum assembly includes yieldable means normally urging said drum assembly toward said conveyor but yielding to upward pressure.

10. The device of claim 7 wherein said flight bars comprise flat rubber members.

11. The device of claim 7 wherein the upper edge of said flight bars is notched.

12. The device of claim 7 wherein said assist drum assembly has a plurality of flexible free vanes extending out therefrom.

13. In a harvesting machine, a crop pickup device including in combination
   a pickup frame extending rearwardly and upwardly from a front end adjacent ground level,
   an endless conveyor supported on said frame and comprising a series of bars interlocked with each other at each end and extending transversely across said frame to provide an upwardly and rearwardly moving upper reach and a downwardly and forwardly moving lower reach,
   said bars being inset for their full length, except for short end portions adjacent their ends, to provide a trough-like central portion that extends down on the upper reach and up on the lower reach, so that the upper and lower reaches of said central portions lie very close to each other and provide a short radius of turn at the lower end, and flat flight bars secured to some of said inset bars at regular intervals along said conveyor to provide flights, the upper edges of said flight bars being approximately even with the end portions of the inset bars so as not to project substantially outwardly of the trough-like structure and so as to provide pick-up receiving trough portions.

14. The device of claim 13 wherein said flight bars comprise rubber members which flex resiliently on contact with the ground and stiff objects and provide a high coefficient of friction to plant stems so as better to hold and grip plants.

15. The device of claim 13 wherein said flight bars have an upper edge provided with a series of spaced-apart V-shaped notches to help in gripping vines and plant stems.

16. The device of claim 13 having immediately behind a flight bar a pair of straight bars in place of two said inset bars to provide on the lower reach a dirt-freeing opening between the straight bars and adjacent inset bars where said conveyor turns around said short radius at said lower end.

17. The device of claim 13 having
    support means for a guide drum above the troughed lower end of said conveyor,
    a guide drum assembly rotatably mounted on said support means and having resilient means for yielding under pressure, and
    rotating means for driving said drum so that its lower surface is rotating toward the rear, said guide drum's lower surface lying closely adjacent to the lower end of said conveyor.

18. The device of claim 17 wherein said guide drum assembly has a plurality of flexible free vanes extending out therefrom to cooperate with the flat flights and the trough portions of the conveyor.

19. The device of claim 17 wherein said support means for said guide drum assembly includes yieldable means normally urging said drum assembly toward said conveyor but yielding to upward pressure.

20. In a harvesting machine, a crop pickup device including in combination
    a pickup frame extending rearwardly and upwardly from a front end adjacent ground level,
    an endless conveyor supported on said frame and having an upwardly and rearwardly moving upper reach and a downwardly and forwardly moving lower reach,
    support means for a guide drum above the lower end of said conveyor,
    a guide drum assembly rotatably mounted on said support means and having resilient means for yielding under pressure, and
    rotating means for driving said drum so that its lower surface is rotating toward the rear, said rotating means being a continuous belt engaging said drum in a friction drive to enable slipping and extending centrally above and substantially parallel to said upper reach for substantially the full length thereof, to prevent roll-back of plants moving up said conveyor.

21. In a harvesting machine, a crop pickup devcie including in combination a pickup frame extending rearwardly and upwardly frof a front end adjacent ground level,
an endless conveyor supported on said frame and having an upwardly and rearwardly moving upper reach and a downwardly and forwardly moving lower reach,
support means for a guide drum above the lower end of said conveyor,
a guide drum assembly rotatably mounted on said support means and having resilient means for yielding under pressure, and
rotating means for driving said drum so that its lower surface is rotating toward the rear,
said rotating means including a drum shaft having a centrally located pulley wheel, a drive shaft above and parallel to the upper end of said conveyor and a hold-down and drive chain extending from said drive shaft to said pulley wheel centrally of said conveyor and a spaced distance above it.

22. The device of claim 21 having at the upper end of the conveyor a plurality of generally downwardly extending tines on each side of said chain.

23. In a harvesting machine, a crop pickup device including in combination
    a pickup frame extending rearwardly and upwardly from a front end adjacent and above ground level,
    an endless conveyor supported on said frame and comprising a series of bars interlocked with each other at each end and extending transversely across said frame to provide an upwardly and rearwardly moving upper reach and a downwardly and forwardly moving lower reach,
    said bars being inset for their full length, except for short end portions adjacent their ends, to provide a trough-like central portion that extends down on the upper reach and up on the lower reach, so that the upper and lower reaches of said central portions lie very close to each other and provide a short radius of turn at the lower end,
    flat rubber flight bars secured to some of said inset bars at regular intervals along said conveyor to provide flights, the upper edges of said bars being approximately even with the end portions of the bars and being recessed at intervals to provide catching edges helping to retain vines and the like,
    an assist drum assembly rotatably supported by said frame above the lower end of said conveyor and having yieldable means for engagement with the incoming crop, the lower surface of said drum lying so closely adjacent to said lower end of said conveyor that it and said conveyor cooperate to move the crop onto said conveyor above ground level, and
    drive means for moving said conveyor and for rotating said drum.

References Cited

UNITED STATES PATENTS

| | | | |
|---|---|---|---|
| 1,632,451 | 6/1927 | Pitcher | 171—127 X |
| 2,071,325 | 2/1937 | Bateman et al. | 171—127 |
| 2,733,904 | 2/1956 | Gauthier et al. | 171—116 |
| 2,828,825 | 4/1958 | Johnson | 171—118 |
| 2,896,728 | 7/1959 | Pridy | 171—130 |
| 2,995,193 | 8/1961 | Salmon | 171—124 X |

ABRAHAM G. STONE, *Primary Examiner.*

ANTONIO F. GUIDA, *Examiner.*